United States Patent [19]

Keller et al.

[11] 4,238,601
[45] Dec. 9, 1980

[54] PERFLUORINATED ALIPHATIC PHENOXY BISORTHODINITRILES AND POLYPHTHALOCYANINES THEREFROM

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 51,569

[22] Filed: Jun. 25, 1979

[51] Int. Cl.³ .............................................. C08G 73/06
[52] U.S. Cl. ..................................... 528/206; 528/86; 528/166; 528/168; 528/353; 260/465 F
[58] Field of Search ................ 528/353, 206, 86, 166, 528/168; 260/465 F

[56] References Cited

U.S. PATENT DOCUMENTS 3,993,631  11/1976  Griffith et al. ................. 528/353
4,067,860  1/1978   Griffith et al. ................. 528/353

*Primary Examiner*—Lester L. Lee
*Attorney, Agent, or Firm*—R. S. Sciascia; Philip Schneider; Thomas McDonnell

[57] ABSTRACT

A bisorthodinitrile of the formula:

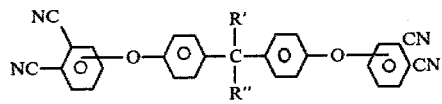

wherein R' and R" are perfluorinated alkyls having from 1 to 4 carbon atoms, and the phenyl groups are attached at the para position. A polyphthalocyanine resin is prepared by heating one or more of these bisorthodinitriles at a temperature from about 260° C. to about 295° C. These resins are particularly useful in high-temperature structural composites used in high-temperature, moist or corrosive environments.

7 Claims, No Drawings

PERFLUORINATED ALIPHATIC PHENOXY BISORTHODINITRILES AND POLYPHTHALOCYANINES THEREFROM

BACKGROUND OF THE INVENTION

The present invention pertains generally to high-temperature resins and their precursors and in particular to perfluorinated aliphatic phenoxy bisorthodinitriles and the cyano-addition resins therefrom.

Fiber-reinforced composite materials which comprise carbon or graphite fibers dispersed in a resin are replacing metal in many structural applications because of weight savings, cost effectiveness, better properties and a greater range of properties. The greater range of properties of composites over metals arises because the property variations of polymers are greater than that of alloys. Another advantage of composites over metals is the new design concepts made possible by the improved properties.

Many properties can be changed by modifying the polymer through the addition of constituents in the primary chain or through the additions of substituents to the primary chain. For example, the addition of molecular constituents with known stiffness characteristics to the primary chain can make the polymer extremely stiff or flexible. Adding molecular substituents to the primary chain can radically affect the surface properties of the composite material. However, the overall range of properties is limited by the properties of the polymer.

The variation in properties of the polymers commonly used in composite materials is considerable, but numerous shortcomings exist. For example, the most widely used resins are epoxies and aromatic polyimides. Epoxy-based composites have a maximum service temperature of about 120° C., are quite brittle, absorb water readily, and have a limited engineering reliability. Aromatic polyimides have a higher maximum service temperature, are stiff, absorb water readily, and have a very limited engineering reliability due to trapped solvents and water which is a by-product of the synthesis.

Recently, a new class of resins has been obtained by polymerizing certain bisorthodinitriles. These resins have many properties which are better than the properties of previously used resins, e.g., thermal stability and engineering reliability. The structure of these resins has not been completely confirmed, but for the following reasons, the principal mechanism of formation is theorized to be phthalocyanine nucleation. As the bisorthodinitriles polymerize, the color becomes progressively darker green in the manner similar to phthalocyanines. The polymerization is difficult to initiate and promote which indicates the formation of a large and complex nucleus such as the phthalocyanine nucleus from a large end group such as the phthalonitrile group.

The first resins of this type were prepared from bisorthodinitriles having an amide bridge between the two phthalonitriles. Examples of which are disclosed in U.S. Pat. Nos. 4,056,560, 4,057,569, and 4,136,107 by James R. Griffith and Jacques G. O'Rear.

These resins with comparable structural strength have several advantages over epoxies and polyimides as structural materials. Their maximum temperature stability in an oxygen-containing atmosphere is about 230° C., a temperature that is over 100° C. greater than that for epoxies. Water resistance as measured by the water-soak method is much better than that for epoxies. Some of the resins, depending on the bridging chain, have a much greater elastic modulus than polyimide resins. These resins have many other advantages over polyimides due to an absence of solvents in their preparation, a lower water absortivity, and not being thermoplastic with a low glass-transition temperature.

Although the properties of these resins are excellent, many applications require resins with even better properties. For example, structural materials in a high-pressure steam or sulfur-containing gas environments require a resin having almost no water absorptivity and being extremely resistant towards acidic attack.

SUMMARY OF THE INVENTION

It is therefore an object of the present invention to synthesize a perfluorinated aliphatic phenoxy bisorthodinitrile which is polymerizable to a polyphthalocyanine.

A further object of this invention is to polymerize a polyphthalocyanine having a maximum service temperature of about 300° C. and having a water absorptivity of about 1 weight percent as determined by the water-soak test.

Another object of the present invention is to polymerize a polyphthalocyanine which hardens to a solid having an extremely low surface energy and being resistant to acidic attack.

These and other objects are achieved by synthesizing a bisorthodinitrile with a high fluorine content in the bridging chain and polymerizing a polyphthalocyanine therefrom by heating at a temperature in excess of the melting point of the bisorthodinitrile.

DETAILED DESCRIPTION OF THE INVENTION

The resins of the present invention are characterized as polyphthalocyanines primarily on the basis of the progressively darkening of the green color as the resins are formed. Their formation is difficult to initiate and promote. Also the phthalocyanine formation is a reasonable mechanism in view of the dinitrile end groups of the precursor. It is on this basis that the phthalocyanine formation is believed to be the principal reaction. Other cyano-addition reactions may also be present; however, the resulting resin is a three-dimensional network polymer with exceptional uniformity in properties.

The resin with phthalocyanine nuclei has a structural formula:

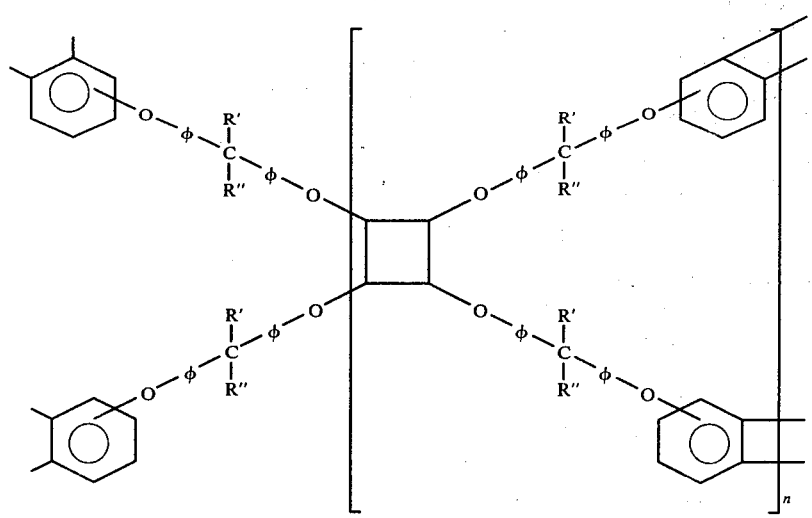

wherein

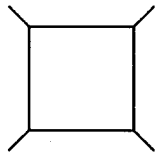

represents a phthalocyanine nucleus, R' and R" represent unbranched perfluorinated alkyls having from 1 to 4 carbon atoms, and the phenyl groups are attached at the para position.

If the phthalocyanine is co-ordinated by a metal or salt, the polyphthalocyanine nucleus is represented by

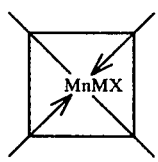

wherein M represents a metal and MX represents a salt. A more detailed formula of both phthalocyanine nuclei are as follows:

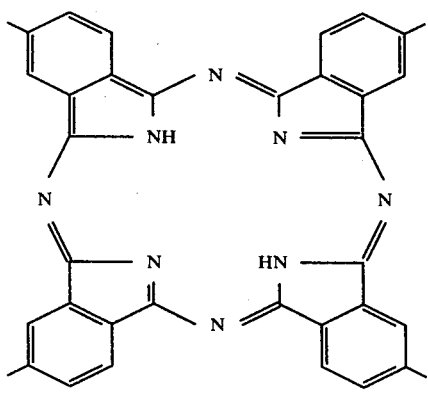

-continued

Hereinafter, the resins of the invention are designated as $(PcO_4\phi_4(CR'R'')_2)_n$ if neat, $(M.PcO_4\phi_4(CR'R'')_2)_n$ if coordinated with a metal and $(MX.PcO_4\phi_4(CR'R'')_2)_n$ if coordinated with a salt.

The most preferred resin has R' and R" as perfluorinated methyls. The properties of the resin are comparable to the other compounds of this invention, but the synthesis utilizes the readily prepared and relatively inexpensive hexafluoroacetone bisphenol A.

The preferred metals for coordinating the resin are copper, iron, zinc, and nickel due to their availability, handling, desired reactivity and the enhanced thermal stability of the resulting resins. Examples of other metals which may be used are chromium, molybdenum, vanadium, beryllium, silver, mercury, tin, lead, antimony, calcium, barium, manganese, magnesium, cobalt, palladium, and platinum. The preferred metallic salt for coordination is stannous chloride. This salt increases the reaction rate the most and has the least trouble with poor dispersion and voids caused by entrapped gas. These advantages occur only if the stannous chloride is dispersed by the method described hereinafter. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L., *Phthalocyanine Compounds,* N. Y. Reinhold, 1963, p. 104–141.

The bisorthodinitriles, from which the present polyphthalocyanines are polymerized can be prepared by stirring a perfluoroketone bisphenol, 4-nitrophthalonitrile, and an excess amount of anhydrous potassium carbonate or sodium hydroxide in dry dimethyl sulfoxide (DMSO) at a temperature from room temperature to 90° C. for about six to eighteen hours under inert conditions. The listed bases and solvent are given as examples. Other bases such as lithium or potassium hydroxide may be used and other solvents, e.g. dimethyl formadid would be satisfactory. Upon completion of the reaction, the reaction liquid is filtered to obtain the bisorthodinitrile. The end point is determined by any conventional technique, e.g., ir-analysis.

The perfluorinated bisphenols can be easily prepared by reacting phenol with a perfluorinated acetone. Symmetrical perfluorinated ketones or those terminating at one end with a perfluorinated methyl group can be prepared by the method which comprises reacting a perfluorinated alkene with iodofluoride, reacting the product of the previous step with chlorosulfonic or fluorosulfonic acid to form a sulfonate, and reacting the sulfonate with cesium fluoride to form the perfluorinated ketone. Unsymmetrical perfluorinated ketones as well as symmetrical ones can be prepared by reacting a perfluorinated epoxy with a Lewis acid, e.g., $AlCl_3$. Additional information concerning reactions involving fluorides may be obtained from Chambers, Richard D. *Fluorine in Organic Chemistry,* N.Y., Wiley Interscience, 1973.

The bisorthodinitriles can either be polymerized in one step or stepwise to distinct stages. In either case, polymerization of the present bisorthodinitriles is extremely difficult and requires the polymerization temperature to be near the decomposition temperature of the resulting resin. Temperatures below 260° C. cause the neat polymerization to take many days. Consequently, the bisorthodinitriles must be heated to a temperature from about 260° C. to about 295° C. in order to have the polymerization completed within a reasonable time. The atmosphere can be oxygen-containing, inert, or a vacuum. Regardless of the temperature, the heating is continued until the melt solidifies to an extremely hard material. Often a post cure at a temperature up to 295° C. is used to improve the strength of the resin.

By the preferred method, the material is reacted to the B-stage as a distinct step before it is polymerized to the C-stage. The method comprises heating a bisorthodinitrile to about 250° C. to about 295° C. until the viscosity starts to increase due to the onset of the phthalocyanine formation which is called the B-stage. At the B-stage, the material can be cooled to a frangible solid and can be stored indefinitely without further reaction. The C-stage is obtained from the B-stage resin by breaking up the B-stage resin and heating the resin at a temperature from 260°–295° C. The preferred temperature for reacting the resin to the C-stage is from 280° C. to 290° C. The optimum cure for any particular resin at a particular temperature is determined empirically by testing the structural strength of samples over a range of cure times.

Adding a metal or salt substantially enhances the reaction rate. Stannous chloride enhances the reaction rate the most, reducing the reaction time from many days to a few hours in some cases.

In adding a metal or salt to co-ordinate the phthalocyanine nuclei, the metal or salt is added in a stoichiometric amount while the bisorthodinitrile is molten or powdered. If the amount of metal or salt is less than stoichiometric, i.e., less than one equivalent per two equivalents of the bisorthodinitrile the resulting resin is not completely coordinated with the salt or metal. An amount in excess of stoichiometry would cause the resin to have unreacted metal or salt in it. Avoiding the presence of any unreacted salt or metal is particularly important with the synthesis of the present resins on account of the high temperatures needed for polymerization.

High temperatures further require a high degree of purity on account of the increased reactivity of all species present including the impurities. The preferred amounts of impurities are less than 100 ppm. However, impurities can be present in amounts up to 300 ppm without noticeably affecting the quality of the final resin.

As with previous polyphthalocyanine resins, the dispersion of the salt or metal is affected by the particle size. Since the resin is formed at such high temperatures, dispersion becomes particularly critical. Consequently, particle sized up to 1000 micrometers are preferred.

If stannous chloride is used to co-ordinate the resin, the stannous chloride must be introduced into the melt as stannous chloride dihydrate by the following method. The stannous chloride dihydrate ($SnCl_2.2H_2O$) is added as a melt or powder. If the phthalonitrile is a powder, the mixture is heated, while being stirred, to a temperature from the melting point to about 20° C. in excess thereof until all water is expelled from the mixture and if the phthalonitrile is molten, then the mixture is kept at the melt temperature until all water is expelled. The mixture is then reacted either to the B-stage or C-stage in the manner previously described.

Examples of the preparation of bisorthodinitriles and polyphthalocyanines of this invention are herein given. These examples are given by way of explanation and are not meant to limit the disclosure of the claims to follow in any manner.

EXAMPLE 1

Synthesis of Bisorthodinitrile of Hexafluoroacetone Bisphenol A Using Potassium Carbonate As Base A mixture of 10.1 g (0.03 mol) of hexafluoroacetone bisphenol A, 10.4 g (0.06 mol) of 4-nitrophthalonitrile, 12.4 g (0.09 mol) of anhydrous potassium carbonate and 60 ml of dry dimethyl sulfoxide was stirred under a nitrogen atmosphere at 70°–80° C. for 6 hours. The cooled product mixture was poured into 300 ml of cold dilute hydrochloric acid. The pale brown product was collected by suction filtration and washed with water until the washings were neutral. The crude material was recrystallized from acetonitrile to give 13.8 g (78%), m.p. 230°–233° C. of the desired product.

EXAMPLE 2

Synthesis of Bisorthodinitrile of Hexafluoroacetone Bisphenol A Using Sodium Hydroxide As Base.

A mixture of 67.2 g (0.2 mol) of hexafluoroacetone bisphenol A, 16.5 g (0.4 mol of 50%) aqueous sodium hydroxide, 300 ml of dimethyl sulfoxide and 75 ml of benzene was stirred at reflux for 15 hours under a nitrogen atmosphere and the water which formed as a byproduct was removed with a 8 can-Stark trap. The benzene was removed by distillation and 69.4 g (0.4 mol) of 4-nitrophthalonitrile was added to the reaction mixture at room temperature. The resulting dark mixture was stirred at room temperature for 12 hours under a nitrogen atmosphere. The cooled mixture was then poured into 800 ml of cold water and the pale brown product was collected by suction filtration. Recrystallization from acetonitrile yielded 107 g (91%) of product, m.p. 230°–232° C.

EXAMPLE 3

Polymerization of Bisorthodinitrile of Hexafluoroacetone Bisphenol A

A sample (1.6 g) was placed in a planchet and heated at 280° C. for 7 days. After 3 days at this temperature, the melt began to thicken. On the 4th day, gelation had occurred. The sample was postcured for 3 days to ensure complete polymerization and to toughen the polymer.

EXAMPLE 4

Polymerization of Bisorthodinitrile of Hexafluoroacetone Bisphenol A in the Presence of Stannous Chloride Dihydrate A sample of the monomer (0.51 g, 0.9 mmol) and stannous chloride dihydrate (0.09 g, 0.4 mmol) was placed in a test tube and heated at 250° C. for 24 hours. After the sample melted, the sample turned green and became homogeneous immediately. The viscosity of the sample increased rapidly with gelation occurring in 15 minutes.

Samples prepared by a method similar to Example 3 was heated at 280° C. for over 2500 hours in air. At 1600 hours, the weight loss was about one percent of the original total weight. At 2000 hours, the rate of loss began to accelerate rapidly. Water absorptivity of the samples were tested by the water-soak method. Similar samples, i.e., of the neat resin were submerged in water for 2800 hours. The water absorption was about one percent of sample weight at 300 hours in the water. At 2800 hours, the water absorption rose to only 1.1 weight percent. The neat resins have been proven to be self-extinguishing. A sample prepared by a method similar to Example 3 was placed in a flame with a temperature of about 550° C. until combustion had become evident. Upon removal, the combustion immediately stopped.

As these tests demonstrate, the resins of this invention with a bridge having a fluorocarbon and phenoxy moities have exceptional thermal and oxidation resistance along with almost no water absorptivity. Another important feature of these resins, which increases the safety of their use, is that they are self-extinguishing.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A polyphthalocyanine resin having recurring units of the general formula

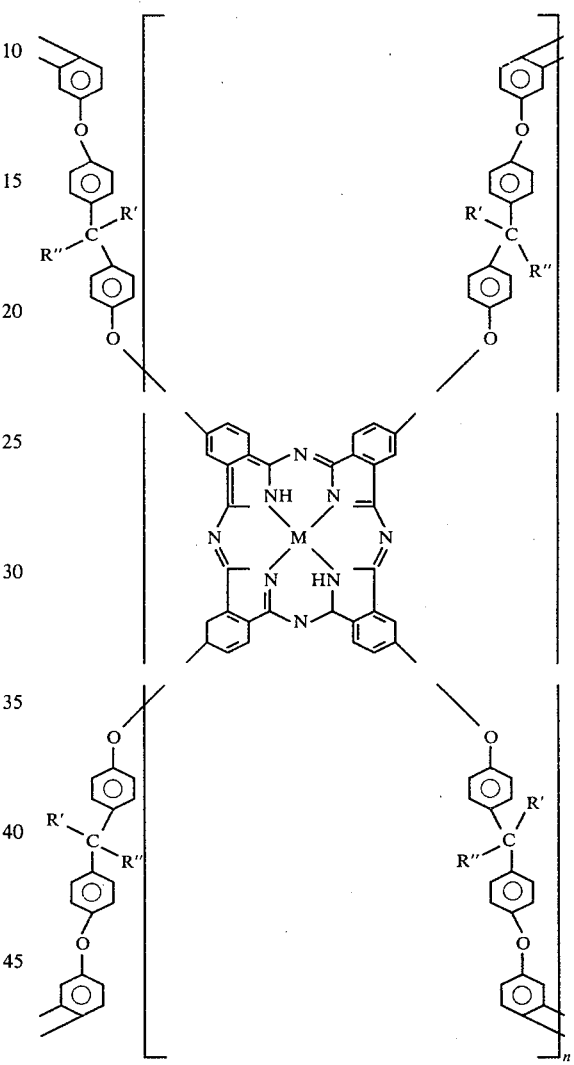

wherein R' and R" are perfluorinated alkyls having from 1 to 4 carbon atoms, the phenyl groups are attached at the paraposition, and M is a metal or salt or a mixture thereof.

2. A polyphthalocyanine resin as claimed in claim 1 wherein R' and R" are perfluorinated methyls.

3. The polyphthalocyanine of claim 1 wherein said metal is selected from the class consisting of chromium, molybdenum, vanadium, beryllium, silver, mercury, aluminum, tin, lead, antimony, calcium, barium, manganese, magnesium zinc, copper, iron, cobalt, nickel, palladium, and platinum.

4. The polyphthalocyanine of claim 3 wherein said metal is selected from the class consisting of copper, silver, and iron.

5. The polyphthalocyanine of claim 1 wherein said salt is selected from the class consisting of cuprous chloride, cuprous bromide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, complex of triphenylphosphine oxide and stannous chloride and mixtures thereof.

6. The polyphthalocyanine of claim 5 wherein said salt is selected from the class consisting of cuprous chloride, stannic chloride, stannous chloride hydrate, and ferrous fluoride.

7. The polyphthalocyanine resin of claim 2 wherein said salt is stannous chloride.

* * * * *